(12) United States Patent
Nimashakavi et al.

(10) Patent No.: US 8,782,411 B2
(45) Date of Patent: Jul. 15, 2014

(54) SYSTEM AND METHOD OF EXTENDING OAUTH SERVER(S) WITH THIRD PARTY AUTHENTICATION/AUTHORIZATION

(75) Inventors: Kirankumar Nimashakavi, Fremont, CA (US); Guang Yang, Beijing (CN); Ming Yin, Beijing (CN); Ting Lou, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/557,476

(22) Filed: Jul. 25, 2012

(65) Prior Publication Data
US 2014/0033279 A1    Jan. 30, 2014

(51) Int. Cl.
*H04L 29/06* (2006.01)
(52) U.S. Cl.
USPC .............................................. 713/168; 726/5
(58) Field of Classification Search
CPC ......... G06F 21/62; G06F 21/30; G06F 21/31; G06F 21/42; G06F 21/335
USPC .......................... 726/4, 5, 9, 10; 713/168, 172
See application file for complete search history.

(56) References Cited

U.S. PATENT DOCUMENTS

| | | | |
|---|---|---|---|
| 2011/0093925 A1 | 4/2011 | Krishnamoorthy et al. | |
| 2011/0179272 A1 | 7/2011 | Klos et al. | |
| 2011/0265172 A1 * | 10/2011 | Sharma et al. | 726/8 |
| 2013/0007846 A1 * | 1/2013 | Murakami et al. | 726/4 |

* cited by examiner

*Primary Examiner* — Edward Zee
(74) *Attorney, Agent, or Firm* — Meyer IP Law Group

(57) ABSTRACT

In accordance with various embodiments, systems and methods that provide for authorization of access to protected resources. Such a system can include a plurality of applications, executing on one or more application servers. The system can also include an authorization server which is operable to interface with one or more remote and/or non-co-located third party authentication servers. Each application can (a) receive a request for authorization to access a controlled resource; (b) redirect the request for authorization to a configurable authentication endpoint identifying a third party authentication server; (c) receive authorization information from the third party authorization server; and (d) issue an authorization code for access to the protected resource.

19 Claims, 4 Drawing Sheets

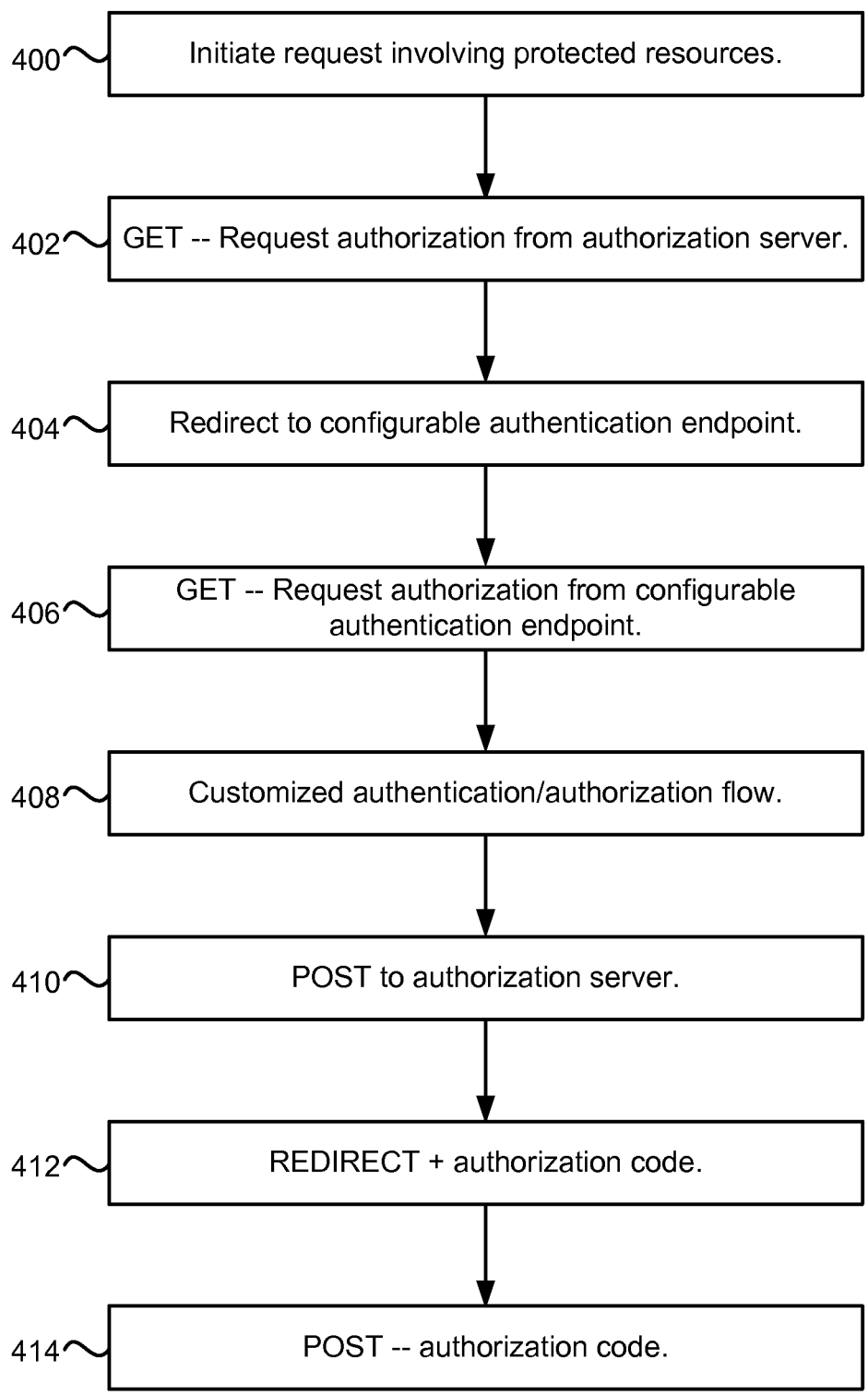

SYSTEM AND METHOD OF EXTENDING OAUTH SERVER(S) WITH THIRD PARTY AUTHENTICATION/AUTHORIZATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

This application is related to all of the following patent applications, all of which are incorporated herein by reference in their entireties, including all Appendices filed therewith:

U.S. patent application Ser. No. 13/557,474, filed Jul. 25, 2012, entitled "SYSTEM AND METHOD OF SECURE SHARING OF RESOURCES WHICH REQUIRE CONSENT OF MULTIPLE RESOURCE OWNERS USING GROUP URI'S"; and U.S. patent application Ser. No. 13/557,478, filed Jul. 25, 2012, entitled "SYSTEM AND METHOD OF MAPPING AND PROTECTING COMMUNICATION SERVICES WITH OAUTH".

FIELD OF THE INVENTION

The current invention relates to an authorization protocol and in particular to a system and method for supporting authorization servers and authentications servers which are not co-located.

BACKGROUND

Open Authorization Protocol (OAuth) is an open standard for authorization. OAuth allows users to, for example, share their private resources (e.g. photos, videos, contact lists) stored on one site with another site without having to hand out their credentials, typically supplying username and password tokens instead. Each token grants access to a specific site (e.g., a video editing site) for specific resources (e.g., just videos from a specific album) and for a defined duration (e.g., the next 2 hours). This allows a user to grant a third party site access to their information stored with another service provider, without sharing their access permissions or the full extent of their data.

The OAuth specification describes the authorization flow on issuing access token based on resource owner (user) authorization. However, the interaction between the authorization/authentication server and the resource owner about how to check the resource owner's credentials is not defined. Existing OAuth implementations only support a co-located authorization server and authentication server. That is to say, the standard OAuth authorization flow and private authentication mechanism are strongly coupled as a whole solution, hard to be separated and re-used with third party authentication/authorization servers.

SUMMARY

In accordance with various embodiments, systems and methods that provide for authorization of access to protected resources are provided. Such a system can include a plurality of applications, executing on one or more application servers. The system can also include an authorization server which is operable to interface with one or more remote and/or non-co-located third party authentication servers. Each application can (a) receive a request for authorization to access a controlled resource; (b) redirect the request for authorization to a configurable authentication endpoint identifying a third party authentication server; (c) receive authorization/authentication information from the third party authentication server; and (d) issue an authorization code for access to the protected resource. The third party authentication server need not be co-located, may be remote from the system, may be outside the direct control of the system operator. A custom mechanism and/or code can be implemented for authorization and authentication.

Embodiments of the present invention extend the present standards for authorization by defining a custom authentication/authorization flow supporting the separation of authentication and resource owner interaction. Using this feature, customers can integrate any authentication/authorization mechanism available in the world (for e.g., Facebook/Google/Subscriber or a custom identity management product) into a services gatekeeper system. This feature enables operators to use their own custom identity management systems or delegate the authentication/authorization service to a third party (e.g., Facebook Facebook/Google/Subscriber or a custom identity management product). When an application requests access to subscriber information, the services gatekeeper system of the present invention can communicate with a third party authentication server via a custom protocol to authenticate the subscriber's credentials. Once authorized, the authentication server can notify the services gatekeeper system which then grants the application access to the requested subscriber information.

Other objects and advantages of the present invention will become apparent to those skilled in the art from the following detailed description of the various embodiments, when read in light of the accompanying drawings.

BRIEF DESCRIPTION OF THE DRAWINGS

FIG. 4 shows a method for authorization and authentication in accordance with an embodiment of the invention.

DETAILED DESCRIPTION

Figure 1:
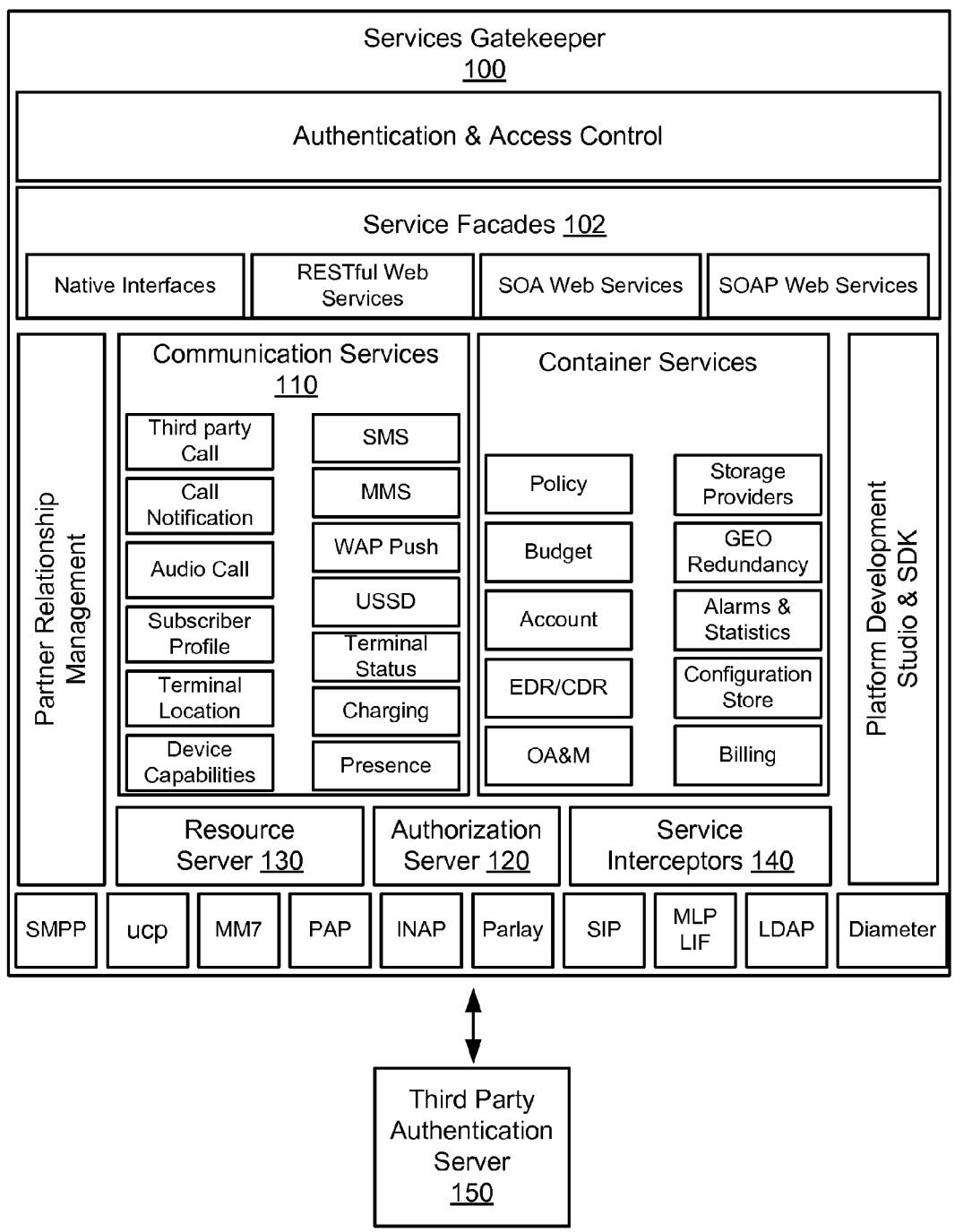
FIG. 1 shows a services gatekeeper system in accordance with an embodiment of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears. Likewise the first two digits in a four digit reference numeral.

FIG. 1 shows elements of a services gatekeeper 100 in accordance with an embodiment of the invention. Services gatekeeper 100 can communicate with third party authentication server 150. As shown in FIG. 1, services gatekeeper 100 controls access to a plurality of communication services 110. Services gatekeeper 100 facilitates the operator's need to provide third party service provider access to its key value-added network capabilities as well as third party APIs in a controlled, secure, optimized, and automated fashion, while providing robust customization and extensibility. Services gatekeeper 100 delivers a converged service exposure layer, including service facades 102 which provide operators the choice and flexibility of using traditional SOAP web services, RESTful web services, SOA web services, and native telecommunication interfaces to expose their network capabilities to third party partners. Thus the services gatekeeper 100 provides flexibility and choice in how third party developers and applications can access the operator's network through multiple types access interfaces (the service facades 102).

Accordingly, the services gatekeeper 100 includes prebuilt, specialized components, the communication services 110, to allow third party developers and application partners to easily access the operator's telecommunication network capabilities. The network capabilities supported by the communication services include, for example, messaging, call control, terminal location, payment, profile and presence.

Services gatekeeper 100 includes an authorization server 120 which provides an authorization service. The conventional OAuth protocol allows controlled access to user resources, for example, picture files identified by a uniform resource identifier (URI). Services gatekeeper 100 includes extended functionality supplied by authorization server 120, in conjunction with resource server 130 and service interceptors 140, for controlling access and exposure of communication services 110 enabling third party applications to access subscribers'/users' resources such as location and charging. For example, this extended functionality allows an application to charge on behalf of the subscriber, assuming the subscriber has explicitly provided approval for this application to do so. Subscribers, however, retain complete control by enabling usage of their personal resources on a granular, time specific basis and can revoke this access at any time. In accordance with embodiments of the present invention, authorization server 120 also supports delegated authentication and authorization enabling subscriber verification through custom communication channels such as short message service (SMS) and unstructured supplementary service data (USSD) with third party authentication server 150. In addition, authorization server 120 also enables operators to offer authentication as a service, thereby allowing subscribers to more easily log into third party applications and websites by using their subscriber ID.

To enable the extended functionality of authorization server 120, services gatekeeper 100 includes a system for mapping and protecting communication services 110 Application Programming Interface (APIs). The system supports granular authorization of API access utilizing the authorization server 120. Services gatekeeper 100 map communication services 110 into an authorization server 120 resource. The resource is defined based on the interface and the method of the communication services 110. The resource can be defined either in a fine grain and/or coarse grain level using a flexible mapping structure. The flexible mapping structure can be used to map a plurality of different communication services to provide scoped access to subscriber information. This scoped access allows the subscriber to provide access to specific portions of their information, e.g., provide access to only location information or charging information without providing access to all information. Thus, the services gatekeeper 100 enables mapping communication services 110 to authorization scopes and automatically protecting subscriber data exposed by the communication services 110 with fine granular control (API level, method level, parameter level) using authorization tokens. This solution provides flexible control of API exposure of subscriber data using authorization server 120. The use of authorization server 120 to provided scoped access to communications services 110 is described in U.S. patent application Ser. No. 13/557,478, filed Jul. 25, 2012, entitled "SYSTEM AND METHOD OF MAPPING AND PROTECTING COMMUNICATION SERVICES WITH OAUTH", which is incorporated herein by reference.

The standard OAuth protocol provides a method by which a client application can access a protected resource, such as user photographs or files, with the permission of the resource owner (user). In general, before the client application can access the protected resource, it must first obtain an authorization grant from the resource owner and then exchange the authorization grant for an access token understood by the resource server. The access token is a proxy which replaces different authorization constructs (e.g. username and password) which need not be disclosed to the client application. The access token can specify a scope and duration. Moreover, the resource server need not interpret and validate diverse authentication schemes as it can rely on the access token alone. However, the conventional OAuth implementation provides a co-located authorization server and authentication server. That is to say, the standard OAuth authorization flow is strongly coupled to the private authentication mechanism as an integrated solution. The authentication and authorization functionality is hard to separate and re-use with third party authentication servers. This is problematic where a third party authorization/authentication service is desired to be initiated, used, and/or changed.

Embodiments of the present invention extend the present standards for authorization/authentication by defining a custom authentication/authorization flow supporting the separation of authentication and resource owner interaction from authorization in a services gatekeeper 100 (see FIG. 1). Services gatekeeper 100 can thereby communicate with third party authentication server 150. Using this feature, the services gatekeeper 100 can integrate any authorization/authentication mechanism available in the world (for e.g., Facebook/Google/Subscriber or a custom identity management product). This feature enables operators of the system to use their own custom identity management systems or delegate the authentication service to a third party (e.g., Facebook Facebook/Google/Subscriber or a custom identity management product).

When a client application requests access to protected subscriber communication services 110, the services gatekeeper 100 can communicate with a third party authentication server 150 via a custom protocol for authorization/authentication. Authorization server 120 includes an authentication interface which includes a configurable authentication endpoint, to which the standard authorization request will be redirected. The re-usable authentication endpoint can be developed using any customizable flow including for example, HTTP interactive, as PHP, ASP, JSP and HTTP Servlet, hosted by the services gatekeeper or any server within the same domain as the services gatekeeper and the authorization server 120, as long as it fulfills the interactive specification of the authorization server 120. The reusable authentication endpoint functions as an authentication interface with the e.g. third party authentication server 150. Once authorized, the third party authentication server 150 can notify the services gatekeeper system 100 which then grants the application access to the requested protected subscriber resources. The third party authentication server 150 need not be co-located, may be remote from the services gatekeeper 100, may be outside the direct control of the operator of services gatekeeper 100. Any custom mechanism and/or code and/or service can be utilized for authorization and authentication.

Figure 2:
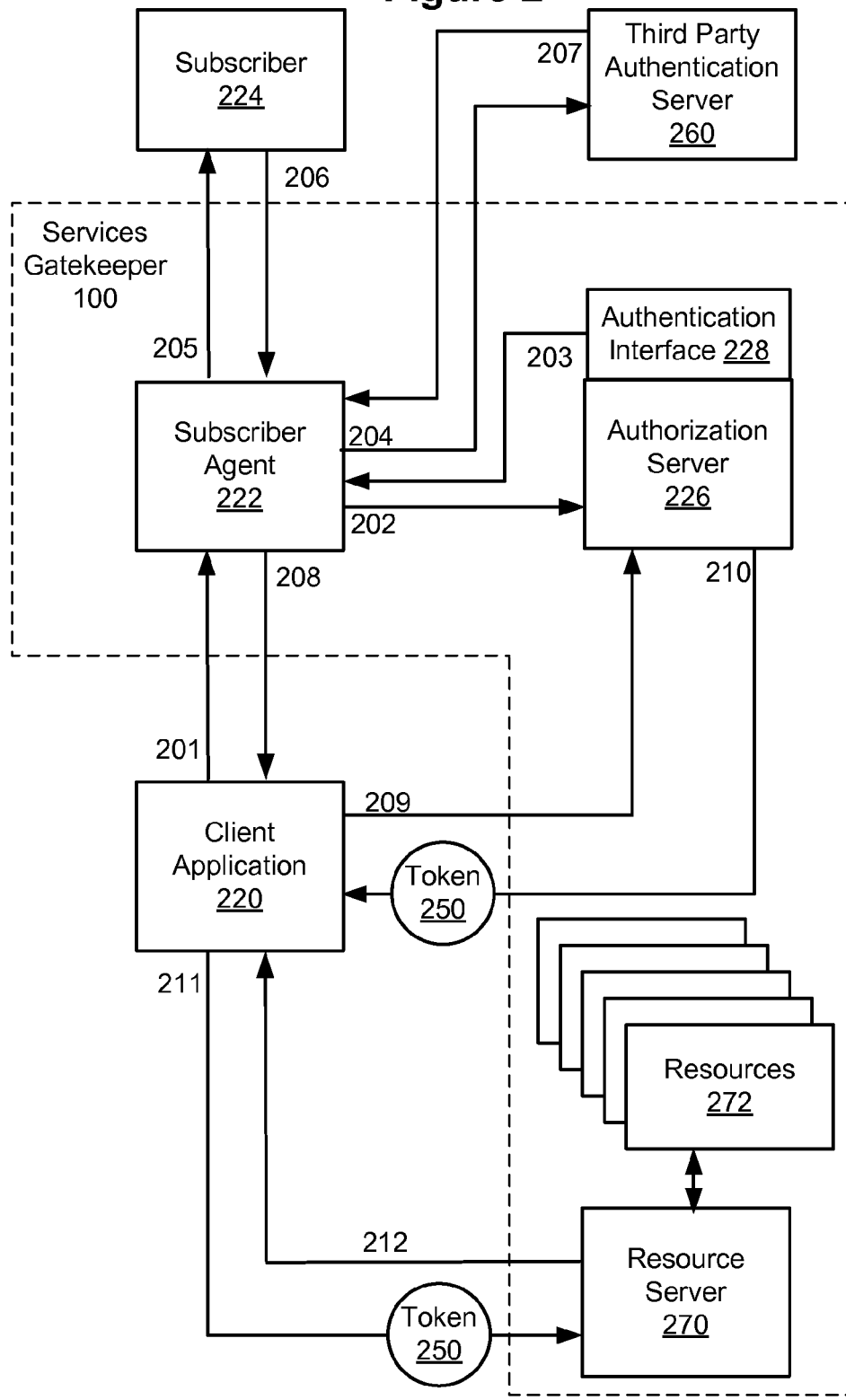
FIG. 2 shows authorization and authentication flow in an authorization and authentication system, of the services gatekeeper system of FIG. 1, in accordance with an embodiment of the invention.

FIG. 2 illustrates authorization/authentication flow in an embodiment of a services gatekeeper 100 incorporating an authorization and authentication system according to an embodiment of the present invention. As shown in FIG. 2, authorization server 226 includes an authentication interface 228 through which the authorization server 226 can communicate with one or more third party authentication servers 260 to verify credentials of subscriber 224.

As shown in FIG. 2, after the subscriber 224 initiates a request which requires access to protected resources 272, for example, access to premium third party content for which the third party wishes to charge the subscriber 224, the client application 220 initiates the flow in operation 201, when it directs the subscriber agent 222 to the authorization endpoint of authorization server 226. The authorization endpoint receives and processes requests by client applications for permission to access protected resources 272 (for example communication services 110 of FIG. 1). The client application 220 includes its client identifier, requested scope, local state, and a redirection URI. In operation 202, the subscriber agent 222 transmits the request from the client application 220 to the authorization server 226.

The authentication interface 228 includes a configurable authentication endpoint, to which the standard authorization request will be redirected. As indicated above, the re-usable authentication endpoint can be developed using any customizable flow including for example, HTTP interactive, as PHP, ASP, JSP and HTTP Servlet, hosted by any server within the same domain as the authorization server 226, as long as it fulfills the interactive specification of the authorization server 226. The reusable authentication endpoint functions as an authentication interface 228 with the e.g. third party authentication server 260.

Once subscriber 224 is authenticated and has approved the access request, the request is redirected back to the grant endpoint, from which normal authorization flow will continue. The authorization server 226 can therefore have different implementation of the authentication endpoint with various authentication/authorization mechanisms, including normal username/password validation, SMS authentication and so on. The different user interfaces can be rendered for the subscriber 224 by the appropriate authentication server 260. The authorization server 226 does not require knowledge of the authentication mechanism/UI performed by the authentication server 260. The authentication/authorization request can thus be performed by the authentication server 260 with no coupling with authorization server 226.

When a request to access the subscriber information of the subscriber 224 is received from a client application 220 at the authorization server 226, the authorization server 226 defines a configurable authentication endpoint as specified in the authentication interface 228 to which the OAuth request will be redirected and transmits, in operation 203, the redirect to the subscriber agent 222. In operation 204, in accordance with the specifications of the authentication interface 228, the subscriber agent 222 transmits a request to the third party authentication server 260 which includes the configurable authentication endpoint. In operations 205, 206, the third party authentication server 260, verifies the credentials and consent of subscriber 224. Generally, the subscriber 224 grants permission by providing a username and password and selecting attributes or services to expose. An authorization code is granted to the client application 220 once permission is obtained from the subscriber 224.

As shown in FIG. 2, in operation 206, the subscriber 224 provides subscriber credentials and consent (if the request is approved) to the subscriber agent 222 which relays 204 the subscriber credentials and consent to the third party authentication server 260. In operation 207, the third party authentication server 260 provides subscriber agent 222 an authorization code. In operation 208, the subscriber agent 222 relays the authorization code to the client application 220. The redirection URI includes an authorization code and any local state previously provided by the client application 220.

In operation 209, after receiving the authorization code, the client application 220 requests an access token 250 from the authorization server 226 through the token endpoint. The client application 220 authenticates with its client credentials and includes the authorization code received in the previous operation 208. The client application 220 also includes the redirection URI used to obtain the authorization code for verification. The authorization server 226 validates the client credentials and the authorization code. The server also ensures that the redirection URI received matches the URI used to redirect the client. In operation 210, if valid, the authorization server 226 responds with an access token 250. In operation 211, the client application 220 then provides the access token 250 to the resource server 270 which validates the access token 250. In operation 212, the resource server responds with the requested access to the specified protected resource(s) 272 (for example communication services 110 of FIG. 1).

Figure 3:
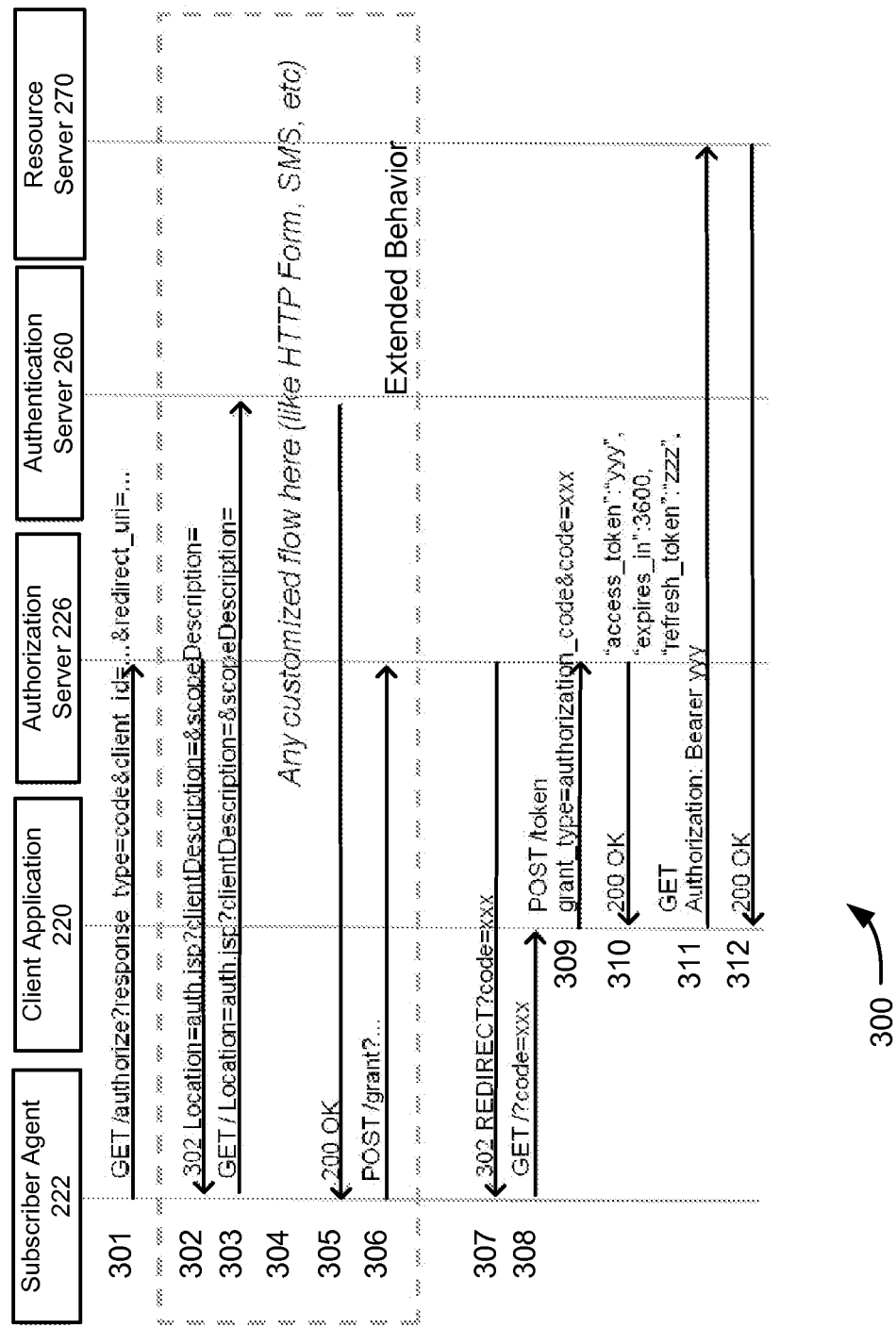
FIG. 3 shows a flow chart illustrating the extended behavior of the method for authorization and authentication of FIG. 2, in accordance with an embodiment of the invention.

FIG. 3 shows a flow chart 300 illustrating method for authorization and authentication using the system of FIG. 2, in accordance with an embodiment of the invention. Steps 302, 303, 304, 305, 306 represent the extended behavior of the system of FIG. 2. As shown in FIG. 3, at step 301, the subscriber agent 222 transmits a GET request to the authorization server 226. At step 302, the authorization server 226 responds to the subscriber agent 222 with a redirect to a configurable authentication endpoint such as third party authentication server 260. At step 303, the subscriber agent 222 transmits a Get request to the third party authentication server 260. At step 304 any customized flow for authentication/authorization is performed. At step 305, third party authentication server 260 responds with authorization/authentication. At step 306, the subscriber agent 222 transmits a POST/grant request to authorization server 226. At step 307, the authorization server 226, responds with a redirect and an authorization code. At step 308, the subscriber agent 222 transmits the redirect and authorization code to the client application 220. At step 309, the client application 220 transmits the authorization code to the token endpoint of the authorization server 226. At step 310, the authorization server 226 responds with the access token 250. At step 311, the client application 220 transmits the access request and the access token 250 to the resource server 270. At step 312, the resource server 270 grants access to the resource 272 of subscriber agent 222 as specified in the access token 250.

FIG. 4 shows a method for authorization and authentication in accordance with an embodiment of the invention. The method shows how a client application can use the authentication server to request and receive authorization to protected resources (for example communication services 110). At step 400, a subscriber visits a web site and triggers a request from a client application to access protected resources of the subscriber. At step 402, the client application sends an OAuth obtainAuthorization request to services gatekeeper for access to the protected resources. Services gatekeeper fetches detailed transaction information based on the client_id and scope parameters specified in the request. At step 404, services gatekeeper responds to the application with a location response header containing the authentication URL appended with a query string consisting of request parameters and the grant URL. The authentication URL is a configurable authentication endpoint as previously described. At step 406, the subscriber's browser continues to access the authentication URL provided in the location field of the response header. The client application receives the redirection request. At step 408, the client application renders one or more HTML pages for the subscriber to view by parsing the query string in the request and generating customized web pages with the information. The subscriber views the customized web page(s) and grants access to protected resources. At step 410, the client application submits the subscriber's selections to the grant URL provided by services gatekeeper in the obtainAuthorization response location header using a POST operation. At step 412, services gatekeeper generates the OAuth authorization code and sends the authorization code to the client application. At step 414, the client application posts the authorization code to the token endpoint. The token endpoint exchanges an authorization code for a token used to access protected resources. The token endpoint can also be used to refresh a previously granted access token.

Although the invention has been described above with respect to communication services in a telecommunications network, the invention also finds application in any situation where its is necessary or desirable to interface with one or more remote and/or non-co-located third party authentication servers.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for enabling authorization of access to a protected resource utilizing a third party authentication service, the system comprising:
   an authorization server, executing on one or more processors, wherein the authorization server is operable to control access of a plurality of applications to the protected resource;
   an authorization interface, at the authorization server, through which the authorization server can communicate with one or more authentication servers;
   wherein when a request to access the protected resource is received from a client application at the authorization server, the authorization server redirects the client application to an authentication endpoint specifying a third party authentication server remote from said authorization server;
   wherein in response to an authentication transaction conducted at the third party authentication server the authorization server issues an authorization code to the client application; and
   wherein the authorization server receives an authentication communication from said third party authentication server, and wherein said authorization server issues said authorization code to the client application in response to receiving said authentication communication.

2. The system of claim 1, wherein the authentication endpoint is a configurable authentication endpoint.

3. The system of claim 1, wherein the authorization server issues an access token to the client application in response to receiving the authorization code from the client application.

4. The system of claim 1, wherein:
   the authorization server issues an access token to the client application in response to receiving the authorization code from the client application; and the system further comprises a resource server, wherein the resource server enables access to the protected resource in response to receiving the access token from the client application.

5. The system of claim 1, wherein the authorization server is decoupled from the authentication mechanism of the third party authentication server.

6. The system of claim 1, comprising a plurality of authentication endpoints.

7. A method for granting access to a protected resource utilizing a third party authentication service, the method operating on one or more microprocessor and comprising:
   (a) receiving at an authorization server a request for authorization from a client application to access the protected resource;
   (b) redirecting the client application from said authorization server to an authentication endpoint identifying a third party authentication server remote from said authorization server;
   (c) receiving authentication information from the third party authentication server at said authorization server, in response to an authentication transaction conducted at the third party authentication server; and
   (d) in response to receiving the authentication information, issuing to the client application an authorization code from said authorization server for access to the protected resource.

8. The method of claim 7, wherein step (b) comprises redirecting the client application to a configurable authentication endpoint identifying a third party authentication server.

9. The system of claim 7, wherein the method further comprises:
   (e) issuing an access token in response to receiving the authorization code.

10. The system of claim 7, wherein:
   (e) issuing an access token in response to receiving the authorization code; and
   (f) granting access to the protected resource in response to receiving the access token.

11. The system of claim 7, wherein step (b) comprises redirecting the client application to an authentication endpoint identifying a remote third party authentication server.

12. The system of claim 7, wherein said authorization server is decoupled from the authentication mechanism of the third party authentication server.

13. The system of claim 7, wherein step (b) comprises redirecting the client application to a selectable one of a plurality of authentication endpoints identifying a non-co-located third party authentication server.

14. A non-transitory computer readable storage medium including instructions stored thereon which, when executed by a computer, cause the computer to perform the steps comprising:
   (a) receiving from a client application at an authorization server a request for authorization to access a protected resource;
   (b) redirecting the client application from said authorization server to an authentication endpoint identifying a third party authentication server remote from said authorization server;
   (c) receiving authentication information from the third party authentication server at said authorization server, in response to an authentication transaction conducted at the third party authentication server; and
   (d) in response to receiving the authentication information, issuing to the client application an authorization code from said authorization server for access to the protected resource.

15. The non-transitory computer readable storage medium of claim 14, wherein the authentication endpoint is a configurable authentication endpoint.

16. The non-transitory computer readable storage medium of claim 14, wherein the authorization server is decoupled from the authentication mechanism of the third party authentication server.

17. The non-transitory computer readable storage medium of claim 14, wherein step (b) comprises redirecting the client application to a selectable one of a plurality of authentication endpoints each identifying a third party authentication server remote from said authorization server.

18. The non-transitory computer readable storage medium of claim 14, wherein the authentication endpoint is a selectable one of a plurality of configurable authentication endpoints.

19. The non-transitory computer readable storage medium of claim 14, wherein said instructions further comprise:
   (e) issuing to the client application an access token in response to receiving the authorization code; and
   (f) granting access to the protected resource in response to receiving the access token from the client application.

* * * * *

UNITED STATES PATENT AND TRADEMARK OFFICE
CERTIFICATE OF CORRECTION

PATENT NO. : 8,782,411 B2  
APPLICATION NO. : 13/557476  
DATED : July 15, 2014  
INVENTOR(S) : Nimashakavi et al.

Page 1 of 1

It is certified that error appears in the above-identified patent and that said Letters Patent is hereby corrected as shown below:

In the Claims

In column 9, line 32, in claim 9, delete "system" and insert -- method --, therefor.

In column 9, line 36, in claim 10, delete "system" and insert -- method --, therefor.

In column 9, line 41, in claim 11, delete "system" and insert -- method --, therefor.

In column 9, line 44, in claim 12, delete "system" and insert -- method --, therefor.

In column 10, line 1, in claim 13, delete "system" and insert -- method --, therefor.

Signed and Sealed this  
Seventh Day of July, 2015

Michelle K. Lee  
*Director of the United States Patent and Trademark Office*